US009604824B2

(12) United States Patent
McKay

(10) Patent No.: US 9,604,824 B2
(45) Date of Patent: Mar. 28, 2017

(54) CLAMP AND TROLLEY SYSTEM

(71) Applicant: Douglas McGregor McKay, Norlane (AU)

(72) Inventor: Douglas McGregor McKay, Norlane (AU)

(*) Notice: Subject to any disclaimer, the term of this patent is extended or adjusted under 35 U.S.C. 154(b) by 0 days.

(21) Appl. No.: 14/382,789

(22) PCT Filed: Mar. 14, 2013

(86) PCT No.: PCT/AU2013/000251
§ 371 (c)(1),
(2) Date: Sep. 4, 2014

(87) PCT Pub. No.: WO2013/134824
PCT Pub. Date: Sep. 19, 2013

(65) Prior Publication Data
US 2015/0014509 A1  Jan. 15, 2015

(30) Foreign Application Priority Data
Mar. 15, 2012 (AU) ................. 2012901048

(51) Int. Cl.
*H02G 1/04* (2006.01)
*H02G 7/08* (2006.01)
(Continued)

(52) U.S. Cl.
CPC ............ *B66C 13/12* (2013.01); *F16L 3/01* (2013.01); *H02G 1/04* (2013.01); *H02G 7/053* (2013.01);
(Continued)

(58) Field of Classification Search
CPC  B66C 13/12; B66C 17/00; B66C 9/14; B66C 11/16; B66C 11/12; F16L 3/01;
(Continued)

(56) References Cited

U.S. PATENT DOCUMENTS 1,151,226 A   8/1915  Steedman
1,841,656 A * 1/1932  Woodruff ............... H02G 7/053
                                                    248/64
(Continued)

FOREIGN PATENT DOCUMENTS

CA   2760966 A1  12/2010
DE   4210280 C1   9/1993
GB   2182302 A    5/1987

OTHER PUBLICATIONS

Australian Patent Office, International Search Report for PCT/AU2013/000251, Jul. 8, 2013, Woden Act 2606, Australia.

*Primary Examiner* — Jonathan Liu
*Assistant Examiner* — Muhammad Ijaz
(74) *Attorney, Agent, or Firm* — Louis Ventre, Jr.

(57) ABSTRACT

The invention provides a clamp and trolley system for moveably attaching a power cable, hose or tube (104) of a lifting apparatus to a guiding cable or track, the clamp 100) comprising: a first clamp component (102) having a first engagement surface (106,116) adapted to engage with the power cable, hose or tube (104); and a second clamp component (114) having a second engagement surface (132, 133) adapted to engage with the power cable, hose or tube, the second clamp component (114) being pivotally attachable to the first clamp component and rigidly fastenable to it in a range of relative orientations; wherein the first and second engagement surfaces (106,116;132,233) are shaped so as to clamp the power cable, hose or tube (104) between the first (102) and second (114) clamp components as the second clamp component (124) is pivoted towards a more closed orientation.

16 Claims, 10 Drawing Sheets

(51) Int. Cl.
  *F16L 3/01* (2006.01)
  *H02G 11/00* (2006.01)
  *B66C 13/12* (2006.01)
  *H02G 7/05* (2006.01)

(52) U.S. Cl.
  CPC ............... *H02G 7/08* (2013.01); *H02G 11/00* (2013.01); *H02G 11/003* (2013.01)

(58) Field of Classification Search
  CPC ......... F16L 3/015; F16L 3/105; F16L 3/1041; F16L 3/1211; H02G 11/00; H02G 7/08; H02G 1/04; H02G 7/053
  USPC ............ 248/558, 559, 61, 62; 254/134.3 PA, 254/134.3 R; 16/97
  See application file for complete search history.

(56) References Cited

U.S. PATENT DOCUMENTS

| | | | | |
|---|---|---|---|---|
| 1,883,260 A | * | 10/1932 | Woodruff | H02G 7/053 248/64 |
| 2,446,887 A | * | 8/1948 | Shearer | E05D 15/063 16/97 |
| 2,571,832 A | * | 10/1951 | Chapin, Jr. | B66C 13/12 105/150 |
| 3,704,350 A | * | 11/1972 | Itoh | H02G 11/003 105/151 |
| 4,525,893 A | * | 7/1985 | Fukada | A47H 13/02 104/108 |
| 4,702,175 A | * | 10/1987 | Brudereck | B66C 13/12 105/154 |
| 8,302,919 B1 | * | 11/2012 | McGrath | F16M 11/10 248/121 |

* cited by examiner

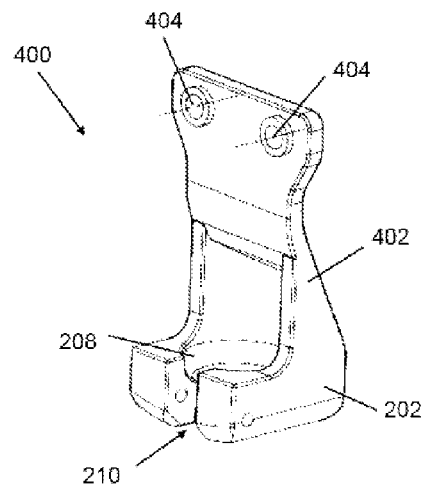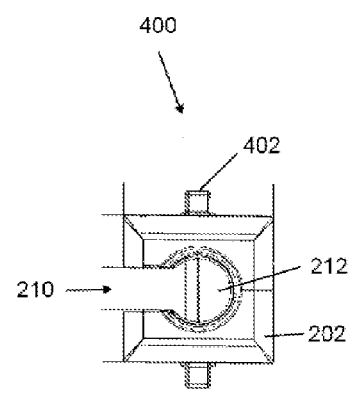
Fig 10    Fig 11
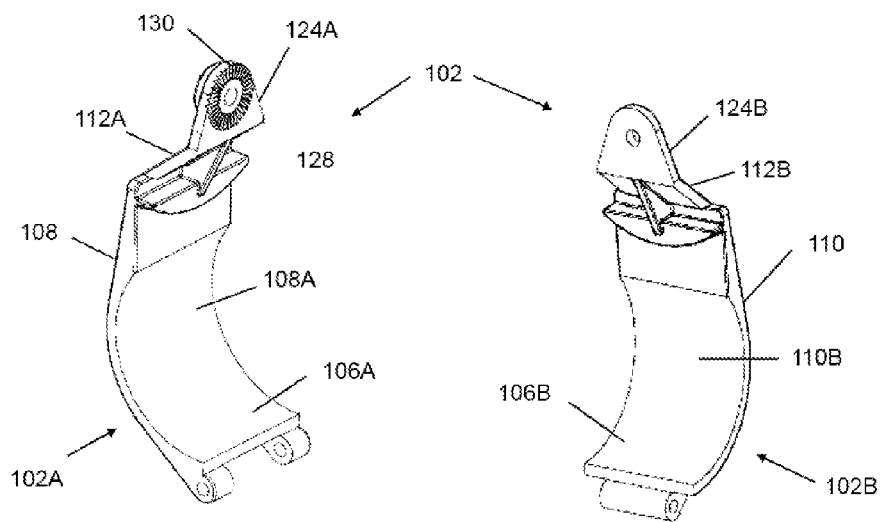
Fig 12A    Fig 12B

CLAMP AND TROLLEY SYSTEM

FIELD

The present invention relates to clamping arrangements, trolleys and track systems. In particular, but not exclusively, embodiments of the present invention relate to trolleys and clamping arrangements which couple thereto for carrying power cables, air hoses and the like for systems, such as bridge cranes, and other plant that travels along wires or tracks. Other embodiments of the present invention relate to track systems, which are particularly useful for bridge crane applications, but are not limited thereto. The trolleys and track systems according to the present invention described herein can be used together, but do not need to be.

BACKGROUND

A wide range of industrial and commercial applications involve the lifting and transportation of loads from one location to another with lifting apparatus, such as powered gantry cranes, jib cranes, bridge cranes or overhead cranes. Such cranes typically comprise a hoist for lifting the load, which is accommodated within a trolley or on rollers. The trolley or rollers run along or within a jib, boom or bridge such that the load can be moved along the length of the jib, boom or bridge.

In the case of overhead or bridge cranes, a pair of spaced apart parallel guides or tracks are situated substantially perpendicular to the bridge and the bridge spans the gap between the parallel guides. The ends of the bridge are typically supported by rollers or trolleys such that the bridge can move along the length of the parallel guides. The parallel guides are typically supported by a floor mounted structure comprising one or more beams and/or columns or by a structure suspended from the roof or overhead structure of a building in which the crane is housed. Hence, loads can be moved anywhere within the reach of the bridge.

With such powered cranes a continuous energy supply needs to be provided to mobile elements of the crane, such as the hoist moving along the length of the bridge and the trolleys or rollers moving the bridge along the guides. The energy supply may be electrical, pneumatic or hydraulic and the appropriate cabling or tubing needs to be routed through the support structure and crane structure to power the mobile elements.

Conventionally, the cabling or tubing is routed through the support and/or crane structures using catenary systems comprising wires or tracks along which dedicated trolleys carrying the cable or tubing runs. One problem with known cable or tubing trolleys is that they use a combination of bolts and spacers to attach the cable or tubing to the trolley. Typically the bolts and/or spacers must be completely undone, detached from the trolley and re-coupled to the trolley to enable fitting, which is fiddly and time consuming, particularly when the bolts and/or spacers are dropped during fitting.

Another problem with conventional cable or tubing trolleys is that they are only suitable for one type of catenary system, namely a wire system, or a track system. Where the trolley is for use with a track system, it is usually for a particular shape of track, such as an I-beam track or a C shaped track. A trolley designed for one shape of track usually cannot be used with another shape of track or does not work as well and can lead to jamming.

A further problem encountered with at least some known cable or tubing trolleys is that they are only suitable for one type cable, tubing or hose. For example, trolleys suitable for routing electrical cable are typically unsuitable for carrying pneumatic hoses. Some trolleys are even more specific and are only suitable for attaching to a particular shape and gauge of electrical cable. However, cabling for such systems is provided in a wide range or shapes and sizes depending on the application.

It is a preferred object of the present invention to provide an improved system that addresses or at least ameliorates one or more of the aforementioned problems.

SUMMARY OF THE INVENTION

In a first broad aspect of the invention there is provided a clamp and trolley system for moveably attaching a power cable, hose or tube of a lifting apparatus to a guiding cable or track, the clamp comprising:

a first clamp component having a first engagement surface adapted to engage with the power cable, hose or tube; and a second clamp component having a second engagement surface adapted to engage with the power cable, hose or tube, the second clamp component being pivotally attachable to the first clamp component and rigidly fastenable to it in a range of relative orientations;

wherein the first and second engagement surfaces are shaped so as to clamp the power cable, hose or tube between the first and second clamp components as the second clamp component is pivoted towards a more closed orientation.

In one embodiment, the clamp and trolley are mutually detachable, the clamp further comprising a trolley attachment component and the trolley comprising a clamp receiving component, enabling the clamp to be attachable to and removable from the trolley in situ. In one version, the trolley attachment component is integral with the first clamp component. In another version, the trolley attachment component is integral with the second clamp component.

In one embodiment, the first clamp component comprises a floor the surface of which provides the first engagement surface, and a pair of side walls, and an arm extending from one of the side walls; and the second clamp component comprises a foot pivotally attachable to the arm, the second engagement surface being provided by an underside of the foot. The surface of the floor and/or the underside of the foot may be convex. The surface of the floor and or the underside of the foot may comprise a channel for receiving the power cable or hose at least partially therein. Each side wall of the first clamp component may comprise a flange that bears against an upper surface of the foot. An upper surface of the foot may comprise a concave profile of complementary shape to an underside of the flanges. The second clamp component may be rotatably attached to the arm with a lockable fastener passing through an aperture in the foot and an aperture in the arm.

In some embodiments, the first and second engagement surfaces may be arranged so that a center of curvature of the second engagement surface is off-center with respect to its axis of pivotal rotation.

In some embodiments, a surface of the second clamp component may be engagable with a surface of the arm of the first clamp component in a plurality of relative positions to provide the fastening in the range of relative orientations referred to in the broad aspect of the invention. This may be achieved with a plurality of radial grooves extending from the aperture in one of the clamp components which engage with a plurality of corresponding radial ridges extending from the aperture in the other clamp component.

In some embodiments, the trolley attachment component comprises a bearing positioned so as to pivotally suspend the clamp from the trolley. The bearing maybe provided at one end of an elongated member of the first clamp component or the second clamp component, and may be substantially hemispherical to allow pivoting in two dimensions.

In some embodiments, the first clamp component comprises two hinged parts that open up to facilitate the reception of the power cable, hose or tube. Such embodiments may be particularly suited for receiving a vacuum hose.

In some embodiments, the second clamp component further comprises a removable snap on fitting to move the second engagement surface closer to the first engagement surface so as to adapt the system to clamp a smaller sized power cable, hose or tube when the snap on fitting is attached.

In one embodiment, the trolley is adapted to sliding on a slot-shaped track and is generally T-shaped such that arms of the T-shape slide on either side of a slot-shaped track and a trunk of the T-shaped projects downwards through the slot, and the arms are held in perpendicular relation to the slot by one or more removable locking pieces that lock into the trunk and extend upwards into the slot-shaped track, whereby when the locking pieces are removed the trolley may be rotated to a parallel orientation with respect to the slot of the track and removed from the track. There may be two of the locking pieces that are inserted into either side of an aperture on the trunk and lock together on the trunk by cooperating serrated projections.

In one embodiment, the trolley is adapted to rolling on a guiding cable and may be attached and removed from the cable by loosening and rotating a removable plate from a body of the trolley that houses a wheel for rolling on the cable, thereby creating a gap through which the cable can pass.

In one embodiment, the trolley is adapted to rolling along an I-beam and comprises:

a pair of threaded rods or axles mounted to a body containing the clamp receiving component, and wheel arrangements threaded on each threaded rod or axle such that a distance between the wheel arrangements can be adjusted by moving them along the threats so as to accommodate different sized I-beams.

BRIEF DESCRIPTION OF DRAWINGS

FIG. 10 is a perspective view of a trolley for an internal track;

FIG. 11 is an underside view of the trolley shown in FIG. 10;

FIG. 12A is a perspective view of a first part of a clamping arrangement for a vacuum hose;

FIG. 12B is a perspective view of a second part of the clamping arrangement for a vacuum hose;

Figure 1:
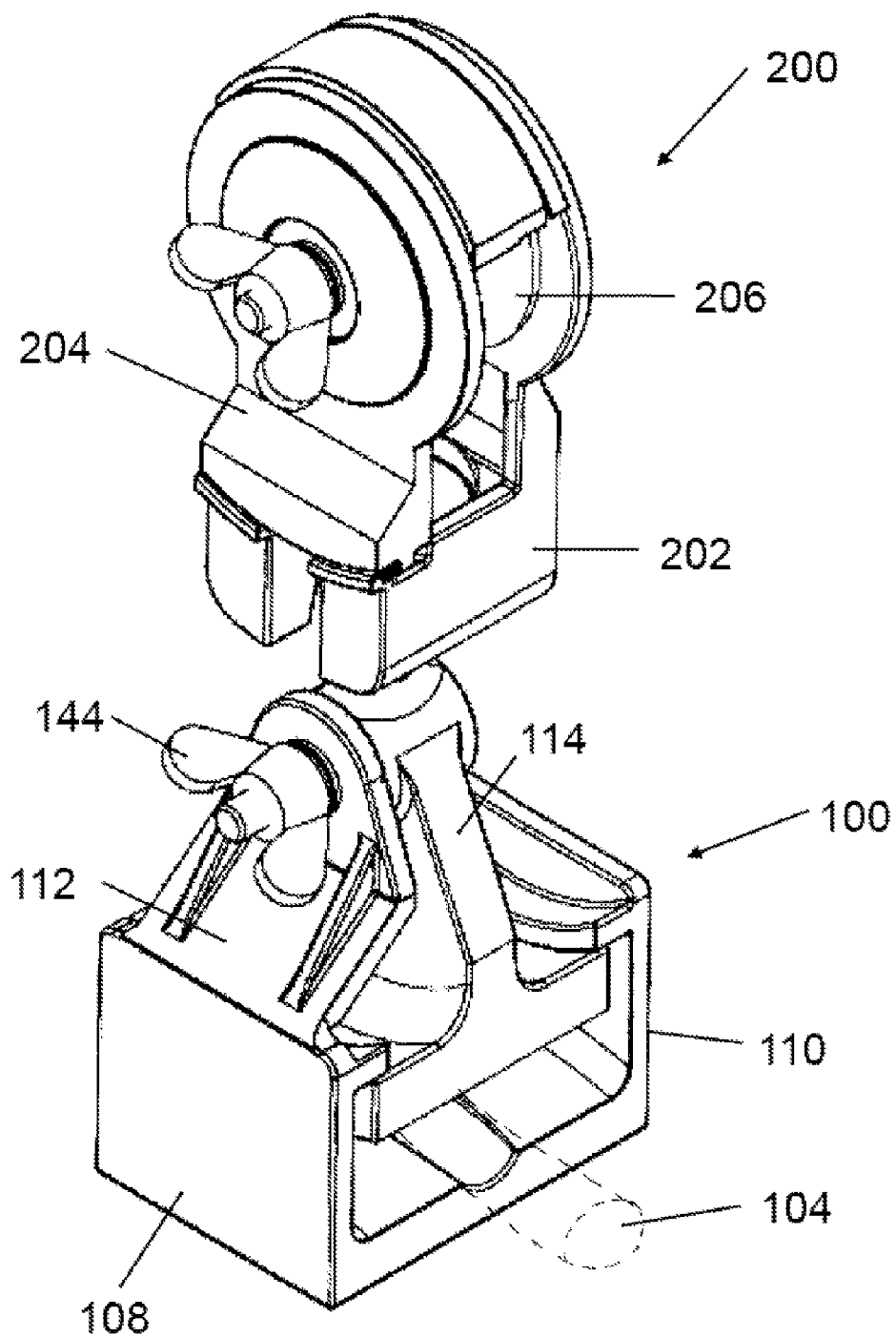
FIG. 1 is a perspective view of a clamping arrangement and a trolley in accordance with embodiments of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention

DETAILED DESCRIPTION OF EMBODIMENTS

Embodiments of the current invention will now be described. In these embodiments, the construction is in plastic, typically injection molded using glass fiber reinforced plastic such as Pa66-gf25, but any other suitable material can be contemplated.

FIG. 1 illustrates a system comprising a clamping arrangement 100 for clamping different sizes and shapes of power cables, hoses or tubing of lifting apparatus and a trolley 200 for running along cables according to embodiments of the present invention. Embodiments of the clamping arrangement 100 will firstly be described followed by embodiments of the trolley. Further embodiments of the trolley for use with internal and external tracks will then be described.

Clamping arrangement 100 can be used for clamping a power cable, hose or tubing of a lifting apparatus, such as, but not limited to gantry cranes, jib cranes, bridge cranes or overhead cranes. The clamping arrangement 100 can be used with electrical, pneumatic or hydraulic cabling or tubing having a substantially flat, circular or other cross sectional shape.

Figure 2A:
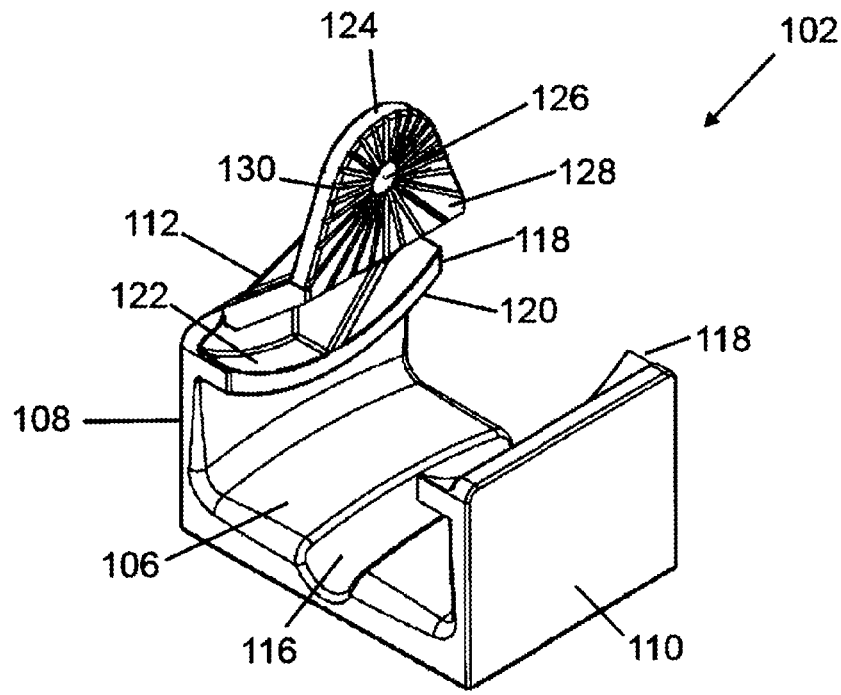
FIG. 2A is a perspective view of a first clamp component of the clamping arrangement shown in FIG. 1.
Figure 3:
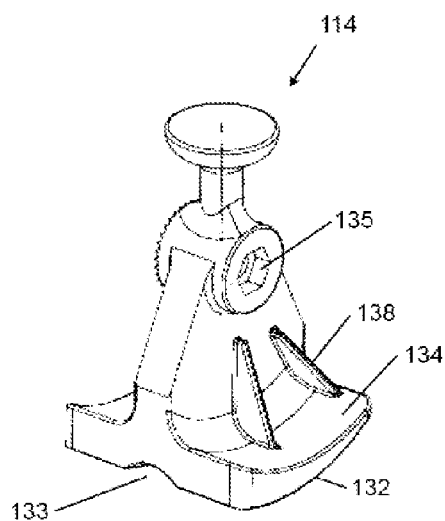
FIG. 3 is a perspective view of a clamping foot for the clamping arrangement shown in FIG. 1.

With additional reference to FIG. 2A and FIG. 3, clamping arrangement 100 comprises a first clamp component 102 for engaging with and receiving the power cable or hose 104. First clamp component 102 comprises a floor 106 and a pair of side walls 108, 110 extending substantially perpendicularly upwardly from the floor 106. An arm 112 extends upwardly at an angle from one of the side walls 108. In some embodiments, arm 112 is angled at about 36 degrees to the vertical of side wall 108 from which it extends. However, other angles and lengths of arm 112 can be employed. Clamping arrangement 100 comprises a second clamp component in the form of a clamping foot 114 rotatably attachable to the arm 112 for clamping the power cable or hose 104 between a second engagement surface comprising an underside 132 of clamping foot 114 and a first engagement surface comprising the floor 106 of the first clamp component 102.

In preferred embodiments, floor 106 of first clamp component 102 is convex and in one embodiment has a radius of curvature of about 95 mm, although other radii of curvature can be used for larger or smaller first clamp components. In some embodiments, as shown in FIGS. 1 and 2, floor 106 of the first clamp component comprises a channel 116 as part of the first engagement surface that extends at least part way along the length of the floor 106 for receiving power cable or hose 104 at least partially therein. As shown in FIGS. 1 and 2A, channel 116 has a substantially semi-circular cross section particularly suited for receiving part of a cable having a substantially circular cross section. However, it will be appreciated that such embodiments of the present invention can also clamp power cables or hoses of other cross-sectional shapes. It will also be appreciated that channel 116 can be omitted from floor 106.

Each side wall 108, 110 of the first clamp component 102 comprises an inwardly extending flange 118 substantially perpendicular to side walls 108, 110. Flanges 118 extend at least partially along the length of side walls 108, 110 and in the embodiment shown in FIGS. 1 and 2A, flanges 118 extend the full length of side walls 108, 110. At least an underside 120 of each flange 118 has a convex profile and in the embodiment shown in FIGS. 1 and 2A, an upper side 122 of each flange 118 has a convex profile.

As shown in FIG. 2A, arm 112 of the first clamp component 102 comprises a tab 124 at the end thereof which is substantially parallel with side walls 108, 110. Tab 124 comprises an aperture 126 located about a centerline of the tab for rotatably coupling clamping foot 114 thereto. A surface 128 of tab 124 comprises a plurality of radial grooves 130 extending from the location of aperture 126. Grooves 130 are for engaging corresponding ridges of the clamping foot 114 as part of a locking mechanism as described in further detail hereinafter.

Figure 2B:
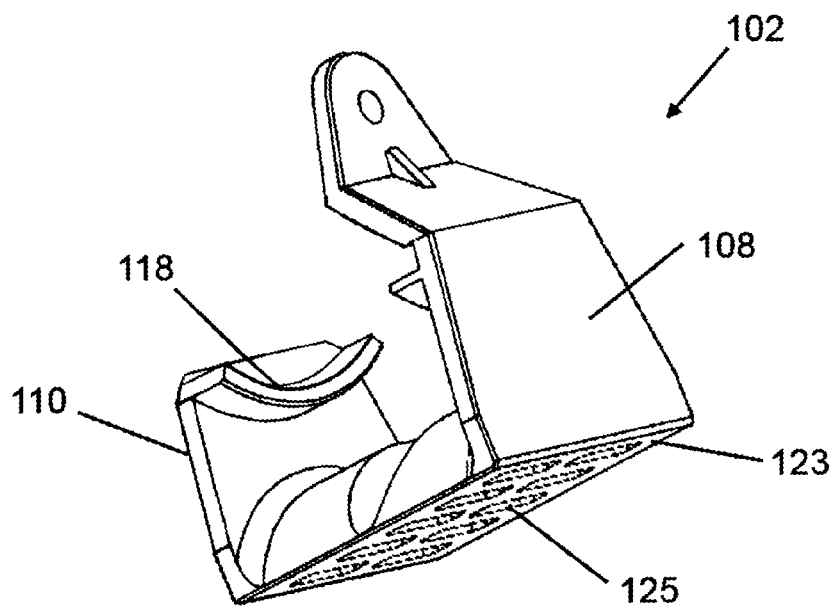
FIG. 2B is a perspective view of another embodiment of the first clamp component.

Another embodiment of first clamp component 102 is shown in FIG. 2B, which comprises many of the features of the first clamp component 102 shown in FIG. 2A. In this embodiment, an underside 123 of floor 106 comprises one or more recesses 125, such that at least part of the convex floor 106 comprises hollow portions. Recesses 125 reduce the amount of material used for the first clamp component 102 and therefore the mass and cost. In this embodiment, convex floor 106 has a radius of curvature of about 80 mm, side walls 108, 110 of the first clamp component 102 are tapered and at least one of flanges 118 is substantially thicker than the previous embodiment, which is easier to produce.

Figure 4:
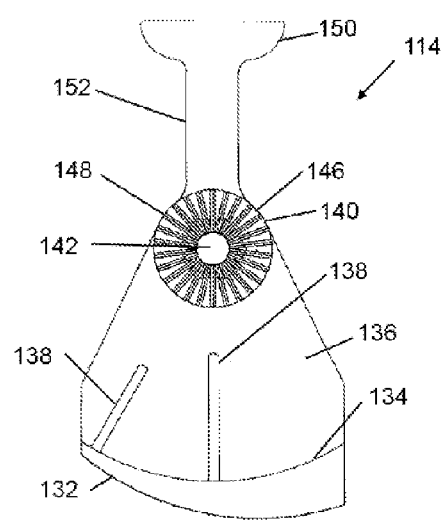
FIG. 4 is a side elevation of the clamping foot shown in FIG. 1.
Figure 5:
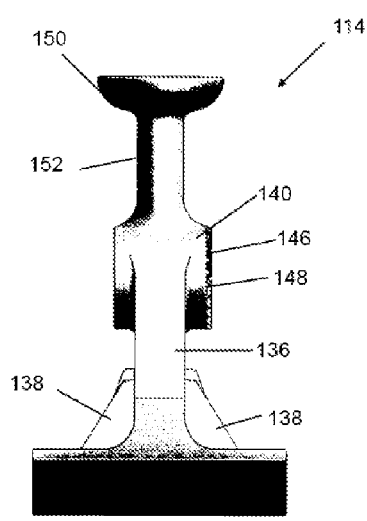
FIG. 5 is an end elevation of the clamping foot shown in FIG. 1.

With reference to the embodiments shown in FIGS. 3-5, second clamp component in the form of clamping foot 114 of the clamping arrangement 100 comprises a base 132 defining a second engagement surface comprising convex underside 132 of clamping foot 114. An upper side 134 of the base comprises a concave profile of complimentary shape to the undersides 120 of the flanges 118 of the side walls 108, 110 of first clamp component 102. A center of curvature of the convex underside 132 of clamping foot 114 is is off-center with respect to a longitudinal axis of the clamping foot 114 such that the convex base is tapered from one side to the other. As shown in the side elevation in FIG. 4, a thickness of the base increases from left to right. This feature assists in the clamping arrangement 100 being able to clamp a range of sizes and shapes of power cable, hose, tube or the like between the convex underside 132 of clamping foot 114 and floor 106 of the first clamp component 102.

According to some embodiments, such as the embodiment shown in FIG. 3, at least part of the convex underside 132 of the base of clamping foot 114 can comprise a channel 133 therein as part of the second engagement surface for receiving power cable, tube or hose 104 at least partially therein. In the embodiment shown in FIG. 3, channel 133 extends the full length of convex underside 132. Channel 133 in the base is substantially aligned with channel 116 in floor 106 of first clamp component 102 when channel 116 is provided.

Clamping foot 114 comprises a body portion 136 extending substantially perpendicularly from the base. Clamping foot 114 can comprise one or more webs 138 for additional strength. Clamping foot 114 comprises a barrel 140 having an aperture 142 therethrough. Aperture 142 is substantially coaxial with a central axis of barrel 140, both of which are substantially perpendicular to body portion 136 of the clamping foot 114.

Clamping foot 114 is rotatably attached to arm 112 of the first clamp component 102 with a lockable fastener passing through aperture 142 in barrel 140 of the clamping foot and aperture 126 in arm 112. Lockable fastener can comprise a bolt, one or more washers and a wing nut 144, as shown in FIG. 1, although other fasteners can be used. In the embodiment shown in FIG. 3, barrel 140 comprises a recess 135 for accommodating a hexagonal head of a bolt.

As shown in FIGS. 3 and 4, a surface 146 of barrel 140 comprises a plurality of ridges 148 extending radially from the location of aperture 142 in the barrel of the clamping foot 114. The plurality of radial ridges 148 in the clamping foot 114 are engaged by or within the plurality of radial grooves 130 in tab 124 of arm 112 of the first clamp component 102, which aid locking clamping foot 114 to the first clamp component 102 in a plurality of relative positions.

In alternative embodiments, the grooves 130 can be provided on the surface 146 of barrel 140 of clamping foot 114 and the ridges 148 can be provided on the arm 112 of the first clamp component 102 to achieve the same locking effect. In other alternative embodiments, the grooves and ridges can be arranged in different shapes, such as a semi-circular pattern and/or the grooves and ridges can be of different shapes.

Clamping foot 114 also comprises a bearing 150 at an opposite end to the base for pivotally suspending the clamping arrangement 100 comprising first clamp component 102 and clamping foot 114 from trolley 200. Bearing 150 is provided at the end of an elongate member 152 protruding from barrel 140 of the clamping foot 114. Bearing 150 comprises a substantially hemispherical portion 154 to provide smooth pivoting in the trolley 200 and to minimize jamming during movement of the trolley 200.

In accordance with another form of the present invention, trolley 200 for a power cable, hose, tubing or the like of a lifting apparatus is provided. As shown in FIG. 1, trolley 200 can be used with the clamping arrangement 100 described herein, but the trolley 200 is not limited to use therewith and can be used with other clamping arrangements or hangers. As shown in the embodiment in FIG. 1, trolley 200 comprises a body 202, a removable plate 204 mountable to the body and at least one wheel or roller 206 rotatably mounted directly or indirectly to the body 202. Each of these features will now be described in more detail with reference to FIGS. 6-8

Figure 6:
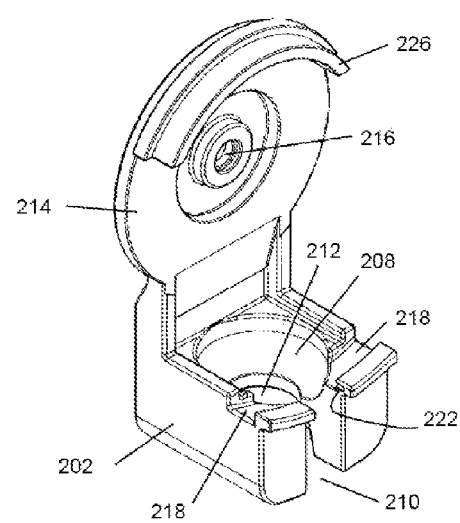
FIG. 6 is a perspective view of a body of the trolley shown in FIG. 1.

Referring to FIG. 6, body 202 of the trolley 200 comprises a substantially hemispherical or bowl-shaped seat 208 for pivotally accommodating a bearing of a clamping arrangement. Seat 208 is particularly suited to accommodating bearing 150 of the clamping arrangement 100 described above for clamping the power cable or hose 104 of the lifting apparatus. Body 202 comprises a slot 210 to enable placement and removal of the bearing 150 on the seat 208. Slot 210 allows elongate member 152 of clamping foot 114 to pass therethrough and aperture 212 at the base of seat 208 allows elongate member 152 to protrude therethrough when bearing 150 is accommodated within seat 208, as shown in FIG. 1.

In this embodiment, body 202 comprises a wall 214 extending substantially perpendicularly from the body. Wall 214 comprises an aperture 216 for receiving a fastener therethrough for rotatably mounting at least one wheel or roller directly or indirectly to the body 202.

Figure 7:
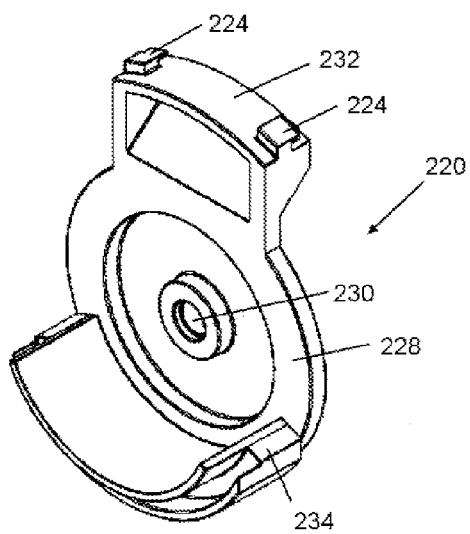
FIG. 7 is a perspective view of a removable plate of the trolley shown in FIG. 1.

In this embodiment body 202 also comprises a channel 218 for receiving a removable plate 220, shown in FIG. 7, which is mountable to the body 202. Channel 218 is curved and is interrupted by slot 210. Adjacent channel 218 is a recess 222 substantially perpendicular to channel 218 for receiving one or more projections 224 of removable plate 220. Wall 214 has a substantially circular shape and comprises a curved flange 226 extending substantially perpendicularly from the wall 214.

As shown in FIG. 7, removable plate 220 comprises a wall 228 having an aperture 230 therethrough and a base portion 232. Base portion 232 comprises projections 224 for engagement with recess 222 of body 202 of the trolley 200. Wall 228 has a substantially circular shape and comprises a double flange arrangement 234 extending substantially perpendicularly from the wall 228. Double flange arrangement 234 is curved and shaped to receive curved flange 226 of body 202.

Figure 8:
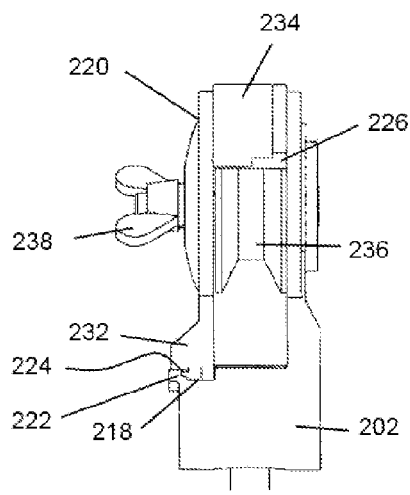
FIG. 8 is an end elevation of the trolley shown in FIG. 1.

FIG. 8 shows body 202 and removable plate 220 coupled together with a guide wheel 236 held therebetween. Projections 224 engage with recess 222 of body 202 and base portion 232 is received within channel 218. A fastener passes through aperture 230 in the plate 220, an aperture in the guide wheel 236 and aperture 216 in the body 202. Double flange arrangement 234 of the plate 220 receives curved flange 226 of body 202. A wing nut 238 couples to the fastener to secure the body 202, plate 220 and guide wheel 236 together. The fastener can be in the form of a bolt comprising a straight pin upon which the guide wheel 236 freely rotates between the body 202 and plate 220. A steel washer and helical spring can also be added before affixing the wing nut 238. However, it will be appreciated that other fastener arrangements can be employed. In this embodiment, guide wheel 236 comprises a groove for running along a cable or wire. Hence, trolley 200 is particularly suited to a cable or wire catenary power supply system.

In use, as exemplified by the embodiment of FIG. 1 and referring back to FIGS. 1 and 8, trolley 200 is attached to a catenary cable by slackening wing nut 238 and slewing removable plate 220 away from body 202 to create a gap through which the catenary cable can pass. Wing nut 238 is then tightened to secure removable plate 220 to body 202 of trolley 200. Neither wing nut 238 nor removable plate 220 needs to be removed completely, thus avoiding separate parts that can be dropped during fitting. A cable or hose 104 is secured to clamping arrangement 100 by slackening wing nut 144 and swinging clamping foot 114 away from first clamp component 102 about the fastener passing through aperture 142 of barrel 140 and tab 124 of first clamp component 102. Clamping foot 114 is swung away in the direction of the thicker side of the convex base 132. Cable or hose 104 is placed on floor 106 of first clamp component 102 and wedged between the floor 106 and convex base 132 as the clamping foot 114 is swung back in the direction of the thinner side of the convex base 132. Ridges 148 engaging with grooves 130 between the surface 146 of the barrel 142 of the clamping foot 114 and the surface 128 of tab 124 of the first clamp component 102 serve to lock the clamping foot 114 in position in the first clamp component 102 with the cable or hose 104 securely held in position as wing nut 144 is tightened. In this embodiment there are no parts to drop or misplace during clamping of the cable or hose 104.

Figure 9:
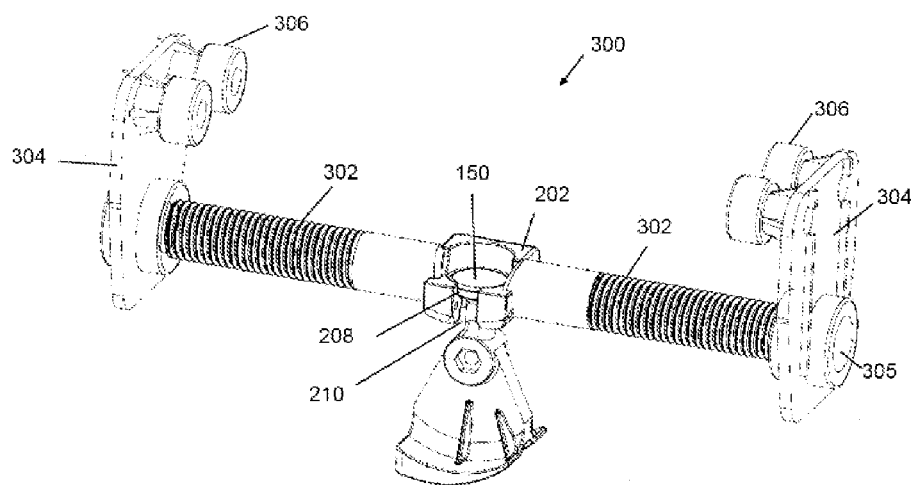
FIG. 9 is a perspective view of a trolley for an external track.

Another embodiment of the trolley is shown FIG. 9, which is for use as an external trolley. The trolley 300 comprises a pair of threads 302 on an axle that incorporates body 202. In some embodiments, a web (not shown) joins the mounting elements to body 202. Body 202 is substantially similar to body 202 described above in that body 202 comprises seat 208 for pivotally accommodating bearing 150 of a clamping foot 114 of a clamping arrangement as described herein and a slot 210 to enable placement and removal of the bearing 150 on the seat 208.

A plate 304 is mounted at respective ends of each of the threaded rods or axles 302, for example via an aperture 305 comprising an internal thread. One or more wheels or rollers 306 are rotatably mounted to each plate 304 for running along the outside of a solid beam or column, such as a universal beam or column. In the embodiment shown in FIG. 9, a pair of rollers 306 is rotatably mounted to each plate 304. This arrangement is particularly suited for running along an I-beam for a top-running trolley or an underslung trolley.

Positions of the plates along the length of the threaded rods or axles 302 are adjustable such that the trolley 300 can be adapted for use with different sizes and shapes of beams and columns. One of the threaded rods or axles 302 has a right-handed thread and one has a left-handed thread. Alternatively, different length threaded rods or axles 302 can be attached to body 202 according to the application.

With reference to FIGS. 10 and 11, according to other embodiments, trolley 400 is for use as an internal trolley. Although omitted from the view in FIG. 10 for the sake of clarity, a plurality of wheels or rollers, such as rollers 306 described above, is rotatably mounted to the body 202 for running along the inside of a hollow track. In the embodiment shown in FIG. 10, body 202 comprises seat 208 for pivotally accommodating bearing 150 of a clamping foot 114 of a clamping arrangement as described herein and a slot 210 to enable placement and removal of the bearing 150 on the seat 208. Body 202 comprises support 402 extending upwardly from body 202 to which wheels or rollers are rotatably mounted by any suitable means. FIG. 10 shows an embodiment in which support 402 comprises two apertures 404 for mounting two rollers on both sides of the support, thus totalling four rollers. Support 402 is shaped, and apertures 404 are positioned, such that wheels or rollers 306 are mounted centrally above seat 208 and evenly distributed for balance purposes. FIG. 11 particularly illustrates this showing the central positioning of the support 402 over aperture 212 at the base of seat 208.

With reference to FIGS. 12A and 12B, according to other embodiments, first clamp component 102 comprises two hinged parts 102A, 102B, which are shown separately in FIGS. 12A and 12B. Parts 102A, 102B are hinged via a pin (not shown) passing through hinge portions 156, 158, although an alternative hinge mechanism could be used. Each part 102A, 102B comprises a respective part 106A, 106B of the floor 106 of the first clamp component 102. Side walls 108, 110 comprise respective curved internal walls 108A, 110B which form a curved surface, which is particularly suited for receiving a vacuum hose of a lifting apparatus. In alternative embodiments, first clamp component 102 for receiving a vacuum hose is a one-piece component with no hinge.

Each part 102A, 102B comprises an arm 112A, 112B extending from a respective side wall 108, 110 and each arm 112A, 112B comprises a respective tab 124A, 124B. Surface 128 of tab 124A comprises grooves 130 for engaging ridges of clamping foot 114 as described above. Clamping foot 114 as described herein is rotatably attachable to the arms 112A, 112B for clamping the vacuum hose against the curved floor 106 and curved internal side walls 108A, 110B of the first clamp component. Hence, both sides of first clamp component 102 are securely attached to clamping foot 114.

Figure 13A:
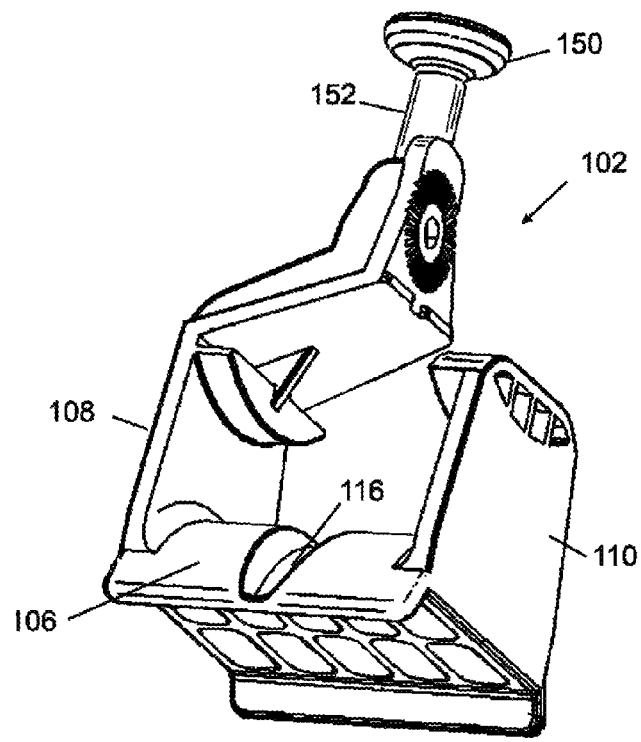
FIGS. 13A and 13B show a variation on the embodiment of the clamp shown in FIGS. 1, 2, 3 and 4 with the trolley attachment component differently placed.
Figure 13B:
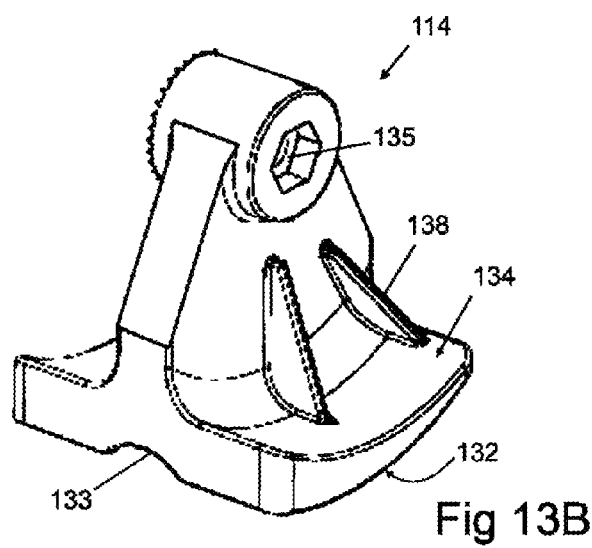

Referring now to FIGS. 13A and 13B, an alternative first clamp component 102 and second clamp component 114 are shown in comparison to the embodiment described above with reference to FIGS. 1, 2, 3 and 4. The difference is that the elongated member 152 and bearing 150 comprising the trolley attachment component are located on the first clamp component rather than on the second clamp component. It has been found in development that for the shapes shown here, this alternative variation allows the clamped cable to hang from the trolley in the same orientation regardless of the pivoting position of the clamping foot 114 a better pivoting effect for cables.

Figure 14:
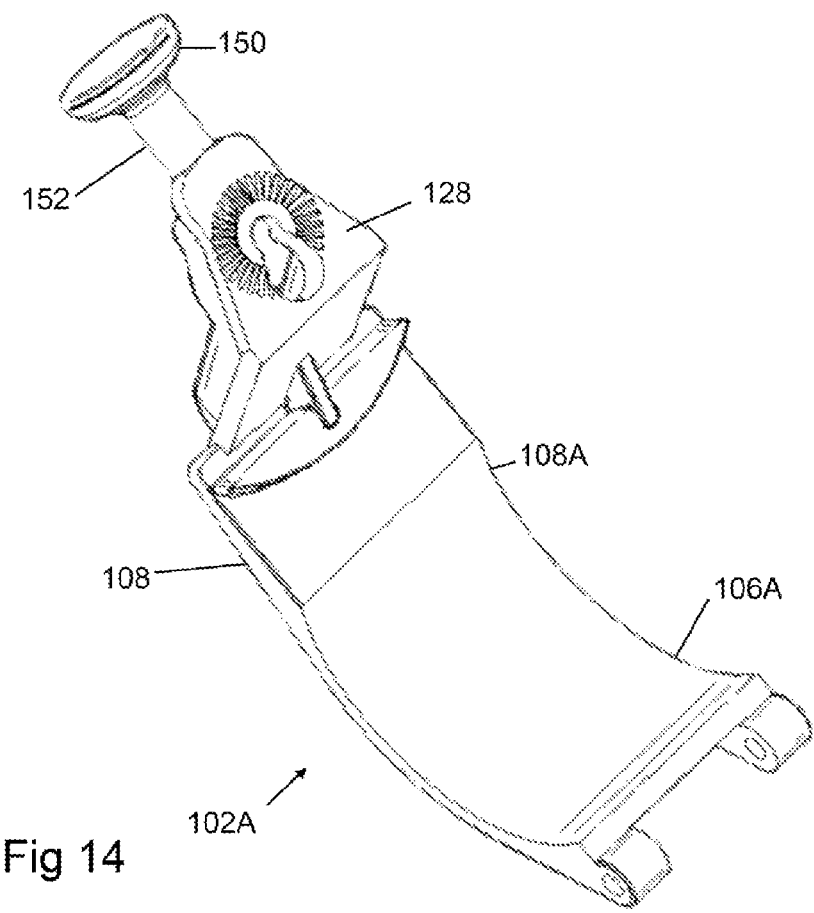
FIG. 14 shows a similar variation on the embodiment shown in FIG. 12 A.

Referring now to FIG. 14, a similar variation is pictured in relation to the embodiment of FIG. 12, where the first clamp component is the composite hinged entity 102A and 102B, and the variation of FIG. 14 comprises the trolley attachment component being on 102A.

Figure 15:
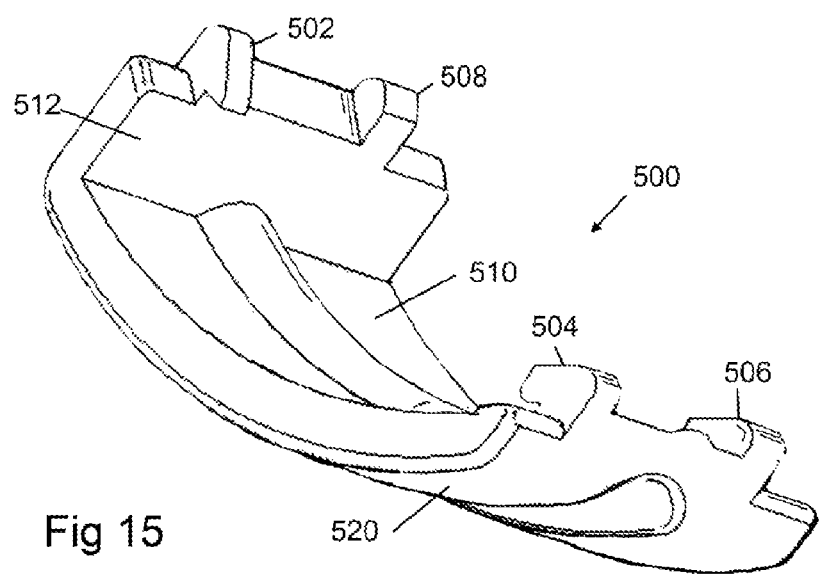
FIG. 15 shows an attachment to adapt a clamp for cables, hoses or tubes of smaller cross section.

Referring now to FIG. 15 a removable snap on fitting 500 is pictured for attachment to the underside of the second clamp component in the form of clamping foot 114 so as to move the second engagement surface closer to the first engagement surface 102 adapting the system to clamp a smaller sized power cable, hose or tube when the snap on fitting is attached. The snap on fitting has four attachment lugs 502, 504, 506 and 508 of which all but one (508) comprise projections for securing the snap on fitting. The fitting has an upper surface 510 mating with the convex underside 132 of the clamping foot 114, and the wall 512 matches the thick end of the tapering base, whereby convex underside 132 of the clamping foot 114 which previously provided the second engagement surface is covered by the snap on fitting 500 and underside 520 of the snap on fitting now provides the second engagement surface.

Figure 16A:
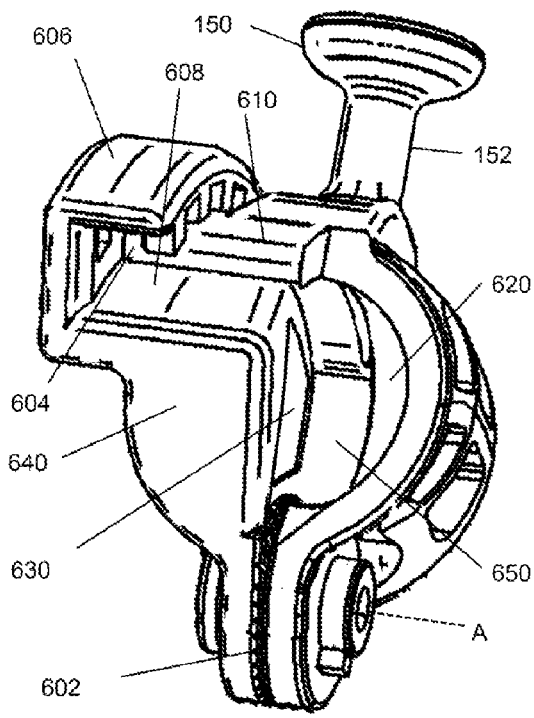
FIGS. 16A and 16B show another embodiment realizing the invention with a different arrangement of first and second clamp components.
Figure 16B:
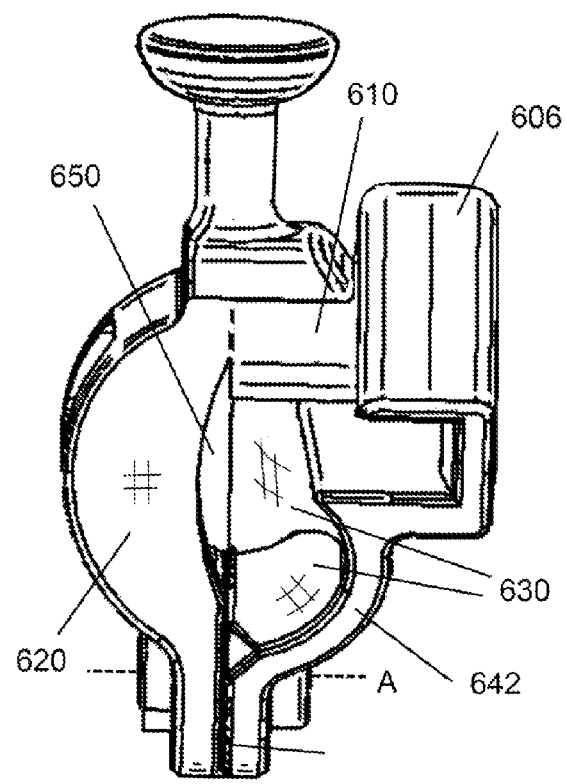

Referring to FIGS. 16A and 16B, two opposing views are shown of another embodiment realizing the invention with a different arrangement of first and second clamp components, particularly suited to clamping round electrical cable of various sizes with the one unit. The first and second clamp components are pivotally attached about axis A through the fastener arrangement 602 previously described, but in this case the first clamp component does not comprise a floor, but rather is disposed on one side and the second clamp component is disposed on the other side. The first clamp component comprises first engagement surfaces 630 which are tapering away from a relatively broad wall 640 shown in FIG. 16A to a relatively narrow surface wall 642 shown in FIG. 16B. The first clamp component also comprises an arcuate channel 606 with the center of curvature at the axis A and the second clamp component comprises a corresponding arcuate surface 610 with a projection 604 engaging with the channel. The second clamp component also comprises second engagement surface 620 which is shaped to cooperate with the first engagement surface 630 according to the invention. In both diagrams, a void 650 can be seen from both directions showing where the cable passes to be clamped by rotation and fastening as previously described, such that irrespective of diameter the cable is clamped centrally below the bearing 150.

Figure 17A:
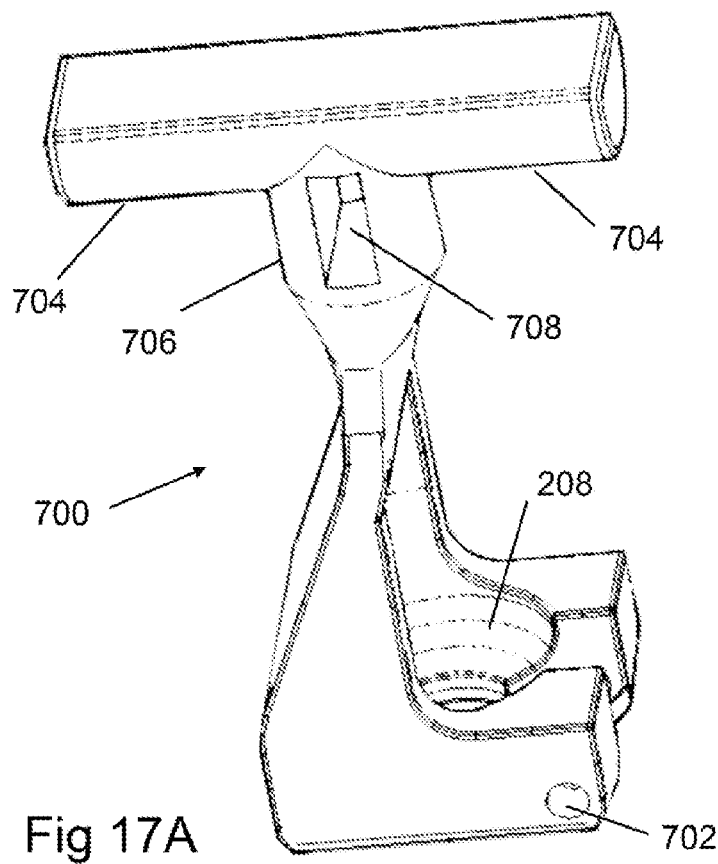
FIGS. 17A, 17B and 17C show a trolley adapted to a sliding track in components and in use.
Figure 17B:
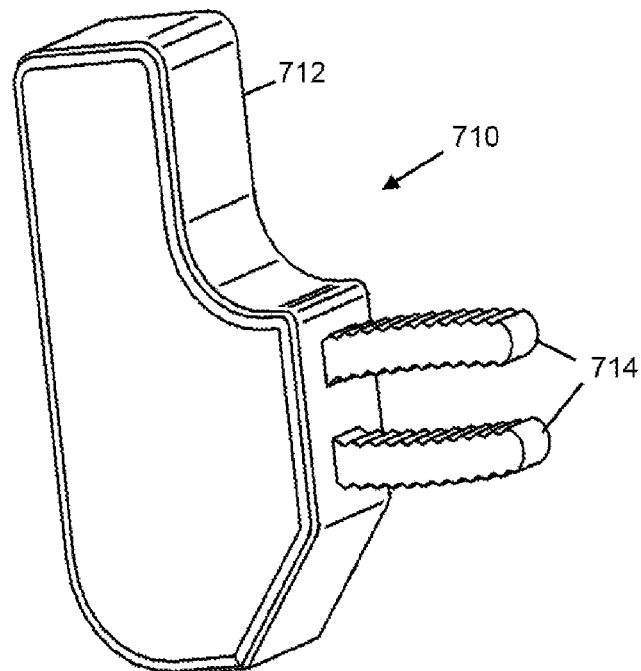
Figure 17C:
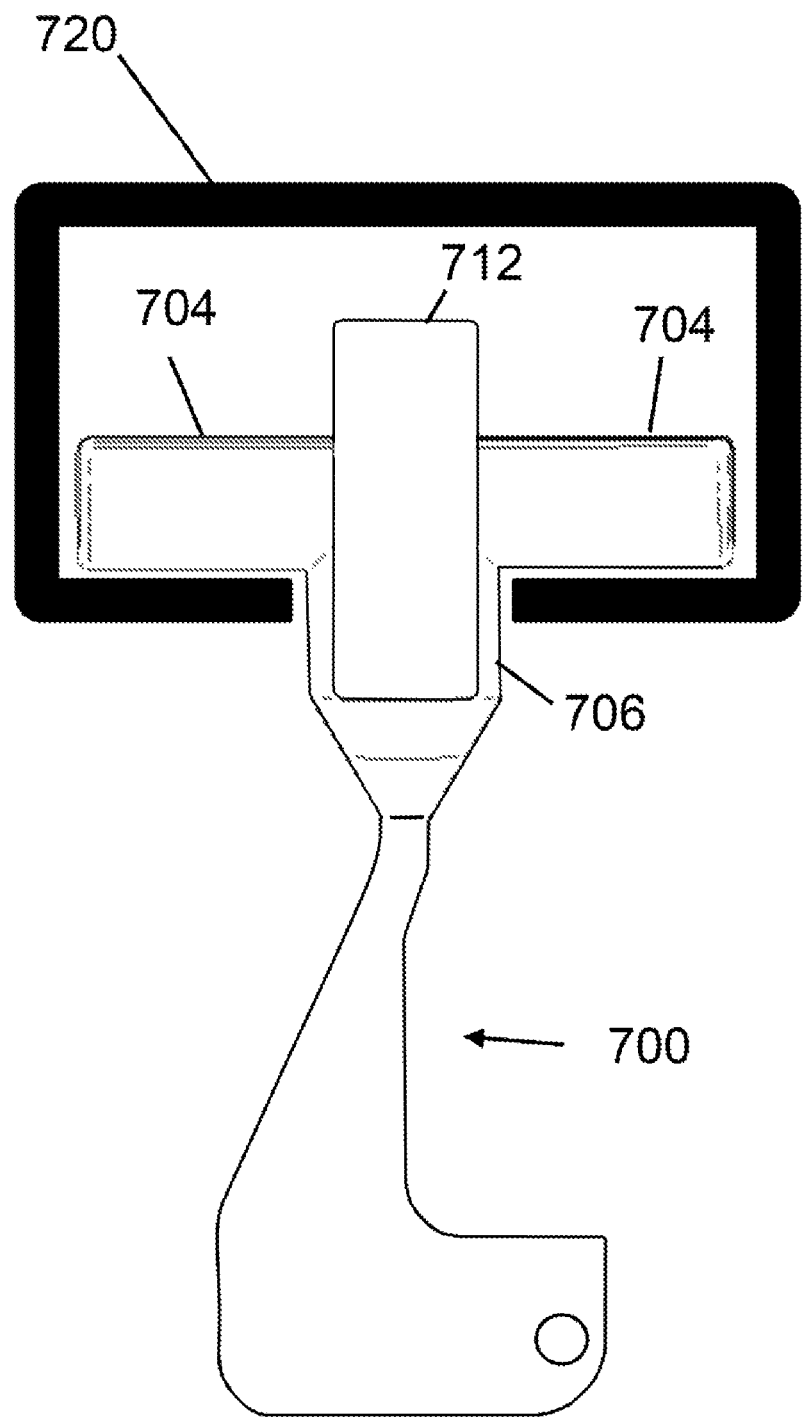

Referring now to FIGS. 17A, 17B and 17C, trolley 700 is adapted to sliding on a slot-shaped track 720 and is generally T-shaped such that arms 704 of the T-shape slide on either side of the slot-shaped track 720 and a trunk 706 of the T-shape projects downwards through the slot, and the arms 704 are held in perpendicular relation to the slot by one or more removable locking pieces 710 that lock into the trunk and extend upwards with a body 712 into the slot-shaped track 720, whereby when the locking pieces 710 are removed the trolley may be rotated to a parallel orientation with respect to the slot of the track and removed from the track. In this embodiment two of the locking pieces 710 are inserted into either side of aperture 708 on the trunk 706 and lock together on the trunk by cooperating serrated projections 714. The serrated projections 714 have a slightly curved shape which enables them to fit together in interlocking fashion inside the slot 708.

The skilled addressee will appreciate that the second clamp component such as clamping foot 114 may be rotatably attachable to the different embodiments of first clamp components 102 described herein in a similar manner. It will also be appreciated that different embodiments of the first engagement surface 102 may be interchangeable with different embodiments of the second engagement surface and the second engagement surface is interchangeable with different trolleys 200, 300, 400 described herein. Hence, another aspect of the present invention is a system comprising the first clamp components 102, clamping foot 114 and trolleys 200, 300, 400 described herein.

Persons skilled in the art will also appreciate that many variations may be made to the invention without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. Further, any method steps recited in the claims are not necessarily intended to be performed temporally in the sequence written, or to be performed without pause once started, unless the context requires it.

It is to be understood that, if any prior art publication is referred to herein, such reference does not constitute an admission that the publication forms a part of the common general knowledge in the art, in Australia or any other country.

The invention claimed is:

1. A clamp and trolley system for moveably attaching a power cable, hose or tube of a lifting apparatus to a guiding cable or track, the clamp and trolley system comprising:
   a clamp comprising:
      a first clamp component having a first engagement surface adapted to engage with the power cable, hose or tube;
      a second clamp component having a second engagement surface adapted to engage with the power cable, hose or tube, the second clamp component being pivotally attachable to the first clamp component and rigidly fastenable to it in a range of relative orientations;

a trolley attachment component, the trolley attachment component comprising: an elongate member; and a bearing at an end of the elongate member; and a trolley comprising:
a clamp receiving component comprising a seat adapted to pivotally accommodate the bearing so as to suspend the clamp from the trolley, the seat defining a slot extending into an aperture in a base of the seat;

wherein the slot, the seat and the aperture are configured to enable the elongate member to pass through the slot and to enable placement and removal of the bearing on the seat whereby the clamp is attachable to and removable from the trolley in situ; and wherein the first and second engagement surfaces are shaped so as to clamp the power cable, hose or tube between the first and second clamp components as the second clamp component is pivoted towards a more closed orientation;

wherein the first clamp component comprises:
a floor the surface of which provides the first engagement surface;
a pair of side walls; and
an arm extending from one of the side walls;

wherein the second clamp component comprises a clamping foot pivotally attachable to the arm, the second engagement surface being provided by an underside of the clamping foot; and wherein each side wall of the first clamp component comprises a flange that contacts an upper surface of the clamping foot in a mounted configuration; and the upper surface of the clamping foot comprises a concave profile of complementary shape to an underside of the flanges.

2. The clamp and trolley system of claim 1 wherein the seat is hemispherical or bowl-shaped.

3. The clamp and trolley system of claim 1 wherein the trolley attachment component is integral with the first clamp component.

4. The clamp and trolley system of claim 1 wherein the trolley attachment component is integral with the second clamp component.

5. The clamp and trolley system of claim 1 wherein at least one of the first engagement surface and the second engagement surface are convex.

6. The clamp and trolley system of claim 1 wherein the surface of the floor and or the underside of the clamping foot comprise a channel for receiving the power cable or hose at least partially therein.

7. The clamp and trolley system of claim 1 wherein the second clamp component is rotatably attached to the first clamp component with a lockable fastener passing through an aperture in the second clamp component and an aperture in the first clamp component.

8. The clamp and trolley system of claim 1 wherein the first and second engagement surfaces are arranged so that a center of curvature of the second engagement surface is center with respect to its axis of pivotal rotation.

9. The clamp and trolley system of claim 1 wherein a second surface of the second clamp component is engageable with a first surface of the first clamp component in a plurality of relative positions to provide the fastening in the range of relative orientations.

10. The clamp and trolley system of claim 9 wherein the plurality of relative positions is achieved with a plurality of radial grooves extending from the aperture in one of the clamp components which engage with a plurality of corresponding radial ridges extending from the aperture in the other clamp component.

11. The clamp and trolley system of claim 1 wherein the first clamp component comprises two hinged parts that open up to receive the power cable, hose or tube.

12. The clamp and trolley system of claim 1 wherein the second clamp component further comprises a removable snap on fitting to move the second engagement surface closer to the first engagement surface so as to adapt the system to clamp a smaller sized power cable, hose or tube when the snap on fitting is attached.

13. The clamp and trolley system of claim 1 wherein the trolley is adapted to sliding on a slot-shaped track and comprises a T-shaped portion such that arms of the T-shaped portion slide on either side of a slot-shaped track and a trunk of the T-shaped portion projects downwards through the slot, and the arms are held in perpendicular relation to the slot by one or more removable locking pieces that lock into the trunk and extend upwards into the slot-shaped track, whereby when the locking pieces are removed the trolley may be rotated to a parallel orientation with respect to the slot of the track and removed from the track.

14. The clamp and trolley system of claim 13 wherein there are two of the locking pieces that are inserted into either side of an aperture on the trunk and lock together on the trunk by cooperating serrated projections.

15. The clamp and trolley system of claim 1 wherein the trolley is adapted to rolling on a guiding cable and may be attached and removed from the cable by loosening and rotating a removable plate from a body of the trolley that houses a wheel for rolling on the cable, thereby creating a gap through which the cable can pass.

16. The clamp and trolley system of claim 1 wherein the trolley is adapted to rolling along an I-beam and comprises:
a pair of threaded rods or axles mounted to a body containing the clamp receiving component, and
wheel arrangements threaded on each threaded rod or axle such that a distance between the wheel arrangements can be adjusted by moving them along the threads so as to accommodate different sized I-beams.

* * * * *